(12) United States Patent
Atkinson

(10) Patent No.: US 9,525,562 B2
(45) Date of Patent: Dec. 20, 2016

(54) MODULAR DETERMINISTIC COMMUNICATION TERMINAL FOR REMOTE SYSTEMS

(71) Applicant: Cahon Systems, Inc., El Cajon, CA (US)

(72) Inventor: Roger F. Atkinson, El Cajon, CA (US)

(73) Assignee: Cahon Systems, Inc., El Cajon, CA (US)

( * ) Notice: Subject to any disclaimer, the term of this patent is extended or adjusted under 35 U.S.C. 154(b) by 0 days.

(21) Appl. No.: 14/286,151

(22) Filed: May 23, 2014

(65) Prior Publication Data

US 2014/0348140 A1   Nov. 27, 2014

Related U.S. Application Data

(60) Provisional application No. 61/826,735, filed on May 23, 2013.

(51) Int. Cl.
*H04B 7/212* (2006.01)
*H04L 12/417* (2006.01)
*H04L 12/40* (2006.01)

(52) U.S. Cl.
CPC ... *H04L 12/417* (2013.01); *H04L 2012/40273* (2013.01)

(58) Field of Classification Search
CPC ............... H04Q 11/04; H04Q 2213/13292; H04L 5/14; H04L 12/56; H04L 2012/56; H04B 7/2123; H04B 7/212; H04B 7/2643; H04B 7/2656; H04W 72/0446; H04W 88/08; H04W 74/04; H04W 80/04; H04W 8/26; H04J 3/1694

USPC ....... 370/294, 322, 337, 347, 349, 389, 442, 370/474, 532, 535, 541
See application file for complete search history.

(56) References Cited

U.S. PATENT DOCUMENTS

| | | | |
|---|---|---|---|
| 6,483,814 B1* | 11/2002 | Hsu .................. | H04B 7/26 370/277 |
| 6,647,428 B1* | 11/2003 | Bannai ............. | H04L 29/12009 370/253 |
| 6,718,139 B1* | 4/2004 | Finan et al. ................ | 398/59 |
| 6,775,254 B1* | 8/2004 | Willenegger ........ | H04B 7/264 370/329 |
| 8,773,996 B2* | 7/2014 | English et al. ............ | 370/235 |
| 2002/0129379 A1* | 9/2002 | Levinson et al. ........ | 725/129 |
| 2002/0154687 A1* | 10/2002 | Bierly .................. | H01Q 3/26 375/222 |
| 2003/0110509 A1* | 6/2003 | Levinson et al. ........ | 725/121 |
| 2004/0244049 A1* | 12/2004 | Hahin et al. ............ | 725/120 |
| 2012/0269512 A1* | 10/2012 | Koley et al. .............. | 398/65 |

* cited by examiner

*Primary Examiner* — Brenda H Pham
(74) *Attorney, Agent, or Firm* — Edell, Shapiro & Finnan, LLC

(57) ABSTRACT

A modular deterministic communication terminal and a method for transmitting user data between the modular deterministic communication terminal and a remote modular deterministic communication terminal are provided. The modular deterministic communication terminal includes at least one logic module including at least one deterministic hardware circuit configured to generate at least one data stream by combining user data of at least two data channels and to separately and independently transmit the at least one data stream via at least one communication link to at least one deterministic hardware circuit provided in the a remote modular deterministic communication terminal.

13 Claims, 5 Drawing Sheets

MODULAR DETERMINISTIC COMMUNICATION TERMINAL FOR REMOTE SYSTEMS

CROSS REFERENCE TO RELATED APPLICATIONS

The present application is a non-provisional application of U.S. Provisional Application No. 61/826,735, entitled "Modular Deterministic Communication Terminal for Remote Systems", filed May 23, 2013, the disclosure of which is hereby incorporated by reference in its entirety.

BACKGROUND

Technical Field

The present invention pertains to communication terminals for use with unmanned vehicle systems and other remote applications. In particular, the present invention pertains to modular deterministic communication terminals that combine user data carried by multiple analog or digital data channels using different physical interfaces and protocols thereby generating a data stream, and that transmit and receive said user data in said data streams via one or more wired or wireless remote communication links to and from one or more similar terminals at remote and usually unattended locations.

To the extent practical, each user data channel is processed by independent modular deterministic hardware components; the use of software is thus minimized in order to improve the reliability of the overall system, particularly in safety critical applications.

Discussion of the Related Art

Generally, modern communication terminals for controlling and monitoring the operation of remote equipment consist of wired or wireless modems that connect the vehicle system's equipment (at either end of the communications link), usually via a single physical interface and protocol such as synchronous serial or Internet Protocol (IP), most often utilizing Ethernet for the physical layer. To accommodate the multiple types of interfaces and protocols that must be used to connect the controlling site's various types of equipment to the remote location's corresponding equipment at the other end of the link, additional hardware and software subsystems must be connected to the modems at each end. This additional hardware and software is required to translate and multiplex the wide variety of information needed into a smaller number of streams (usually one) containing data for transmission over the communication link to the distant communication terminal(s). In most such applications, each communication channel must be de-multiplexed and translated back into the original format at the other end of the link.

An unmanned aerial vehicle system, for instance, usually requires a mixture of real time communication channels for remote control and monitoring of the vehicle, analog or digital video channels to allow the person controlling the vehicle to see where the vehicle is and where it is going, and one or more analog voice channels (with push to talk and squelch) for two way radios on the remote vehicle. Depending on the nature of the vehicle's mission, channels to provide control and monitoring of a wide variety of remote sensors may also be required. Some of these channels are clearly critical to safe operation of the vehicle, while others are not. Furthermore, some of these communication channels may independently require encryption and authentication for operational or safety reasons, while other communication channels may require different encryption keys or may not need encryption at all.

A common characteristic of virtually all such data channels is that their information must be delivered to the distant end in near real time.

In the related art, real time translation and multiplexing/de-multiplexing (mux/demux) functions described in the previous paragraphs have been generally performed in software. This software frequently runs in a single processor, since a single bi-directional data stream is usually required for connection to the modem at each end of the link. An inherent disadvantage of passing real time user data through processors is the sequential nature of such processors; commands are executed one at a time in sequence. Even if each communication channel is assigned to a separate processor, with each such processor connected to a common mux/demux subsystem such as an Ethernet switch or Time Division Multiplex (TDM) hardware, there are still several real time functions associated with each communication channel that must share that channel processor resources, such as the Internet Protocol (IP), the User Datagram Protocol (UDP) and the Transmission Control Protocol (TCP).

A major disadvantage of operating multiple real time software functions in a single processor is the lack of deterministic behavior of the resulting system. Sharing processor resources generally requires use of a Real Time Operating System (RTOS) that attempts to fairly allocate the limited resources available within the processor. Despite the best efforts of highly skilled programmers using a high quality RTOS, when multiple software functions simultaneously and asynchronously compete for the opportunity to execute, there will inevitably be conflicts and undesirable temporal and logical interaction between such functions. Some of these interactions may be unforeseen. These asynchronous conflicts and unforeseen interactions are largely responsible for software's well-earned reputation for hidden errors remaining in the code undiscovered, sometimes for years, before causing a problem. The larger and more complex the software program, the greater the probability of such errors remaining undiscovered. Even assuming error free code (highly unlikely), operation of the resulting system is not deterministic, and may, in the worst case, result in some functions not being completed in a timely manner, thus causing the loss or corruption of user data, or even a system crash.

Systems in the related art frequently limit the available user data throughput to somewhat less than the processor's maximum real time throughput to allow for the occasional bottleneck resulting from multiple asynchronous simultaneous demands on the processor's limited sequential resources. The hardware must be overdesigned to allocate excess processor speed to compensate for worst case timing problems. Such overdesign is usually accomplished by using faster processors or by use of multiple processor cores, but this tends to increase power consumption. Availability of power, and ability to dissipate the resulting heat, are significant limiting factors in many remote applications. If multiple cores are used, the software design, debug, validation and test processes are even more complicated, time consuming and expensive. As higher data rates are required for increased data throughput, and as faster modems, remote transmission links and networks become available, the limitations caused by software bottlenecks become more serious.

There are numerous government regulations regarding reliability of software in aircraft, motor vehicles, medical devices and other applications involving public safety. These regulations can require, for any software that might cause a dangerous malfunction, extensive documentation, validation and certification of the software development process, followed by lengthy and stringent testing and certification of the resulting hardware/software system. These requirements add substantially to the development time and cost associated with prior art software based communication systems.

Any addition or change to the software code in prior art systems necessitates thorough retesting of the entire system or sub-system, and could trigger a requirement for recertification of the software, including functions unrelated to the portion of the software that changed. Existing prior art communication systems that perform most of their real time functions in software are subject to the above described certification requirements (and the associated costs and delays), both initially and whenever a function is added or a change is made. Expandability or growth potential of prior art systems is therefore limited due to the expense, effort and delay incurred when incorporating additional or modified software into those systems to support additional channel capacity.

Systems in the related art, if not designed for the specific application, generally do not provide means to perform functions unique to the user application requirements. As an example, the user may need to embed local or remote terminal administration commands, responses and terminal status reports in streams otherwise intended to be delivered to user equipment at the opposite end of the link. The user would therefore need a user specific multiplex and de-multiplex capability within the communication channel to separate such terminal administration data from data to be delivered to the opposite end of the link.

Another such special function may be translation of one form of navigation information into another for use by a modem for aiming the modem's antenna. Communication terminals in the related art generally do not provide a means of adding such special functions internal to the terminal without major software and possibly hardware additions and rework; otherwise, such functions must be performed in external units, adding size, weight and power to the terminal system, and incurring the additional cost and delay resulting from rewrite and recertification of the system software.

Some systems in the related art are not actually integrated systems at all, but rather collections of separate analog or digital channel interface units, multiplexer(s) and modem(s). Each such channel unit is required to perform the functions required to integrate a particular user interface with a multiplexer and thence to a modem. Each such unit has its own enclosure and power requirements and each requires connectors and cables to connect to the rest of the system. A system assembled from such separate boxes, frequently from different vendors, almost always weighs more, occupies more space, requires more power and cooling and exhibits numerous system integration problems compared to an integrated system designed from the outset to operate as a cohesive whole.

SUMMARY

Therefore, in light of the above, and for other reasons that become apparent when exemplary embodiments are fully described, it is one object to enhance operation of a communication terminal by passing user data only through deterministic hardware circuits without performing real time translation and multiplexing/de-multiplexing operations in software executed on a programmable processor, thereby limiting the use of software to non-real-time terminal administration and control functions wherever practical. Such non-real-time software is generally much simpler and easier to design, debug, validate and test and likely does not need the complexity of a Real Time Operating System (RTOS). In other words, the deterministic hardware circuits are configured to operate, e.g., to generate and transmit at least one data stream without performing any operations in software. Software generally represents non-tangible components of a computer that do not comprise any hardware, that are stored on a non-transitory computer-readable medium and that are executed on a processor.

According to an aspect of an exemplary embodiment, user data may include (but is not limited to) data carried by a data channel.

According to another aspect of an exemplary embodiment, a modular deterministic communication terminal is provided with at least one logic module comprising at least one deterministic hardware circuit configured to generate at least one data stream by combining user data of at least two data channels and to separately and independently transmit the at least one data stream via at least one communication link to at least one deterministic hardware circuit provided in a remote modular deterministic communication terminal.

According to another exemplary embodiment of the invention, a method for transmitting user data between a modular deterministic communication terminal and a remote modular deterministic communication terminal comprises: generating, by at least one logic module comprising at least one deterministic hardware circuit, at least one data stream by combining user data of at least two data channels; and separately and independently transmitting the at least one data stream via at least one communication link to at least one deterministic hardware circuit provided in a remote modular deterministic communication terminal.

In a further exemplary embodiment of the invention a system is provided for transmitting user data between a modular deterministic communication terminal and a remote modular deterministic communication terminal. The system includes a modular deterministic communication control terminal comprising at least one first deterministic hardware circuit and a remote modular deterministic communication terminal comprising at least one second deterministic hardware circuit. The at least one first deterministic hardware circuit is configured to generate at least one data stream by combining user data of at least two data channels and to separately and independently transmit the at least one data stream via at least one communication link to the at least one second deterministic hardware circuit of the remote modular deterministic communication terminal.

According to a further aspect of an exemplary embodiment, the user data carried by multiple data channels is combined or multiplexed by at least one deterministic hardware circuit to generate a data stream that is transmitted via a communication link to a deterministic hardware circuit in a remote terminal to allow a person controlling an unmanned vehicle to see where the vehicle is and where it is going. Each data channel may be related to a specific control or monitor functionality.

It is another object to process all user data in separate and independent parallel deterministic hardware circuits for each data stream in a communication terminal instead of in software executed sequentially in microcontrollers or similar processors. This approach will result in much higher data rates, lower power dissipation, highly deterministic behavior and virtual elimination of temporal and logical interaction between functions. This also will prevent asynchronous conflicts and unforeseen interactions between data streams.

A further object of the invention is to enhance flexibility in a communication terminal by implementing a modular deterministic hardware architecture that multiplexes and de-multiplexes a variety of analog or digital data channels with different physical interfaces and protocols to and from one or more common wired or wireless remote communications means. These data channels are implemented in independent deterministic hardware circuits so that each such data channel can be customized without affecting the other data channels.

Yet another object of the present invention is to enhance flexibility in a communication terminal by implementing a modular deterministic hardware architecture that allows addition of or changes to hardware user data channels and associated interfaces with minimal or no changes to other hardware. This modular approach assures that there is minimal or no effect on functions unrelated to the function that was added or changed.

A still further object of the present invention is to enhance flexibility and expandability of a modular deterministic hardware communication terminal by connecting a Micro Controller Unit (MCU) to a deterministic hardware circuit. By implementing logic modules in this manner, user specific functions unique to the user application requirements can be provided. In other words, logic modules provide a means of adding special functions internal to the terminal with minimal or no hardware or software additions and rework.

Still another object is to enhance flexibility in a communication terminal by implementing a modular deterministic hardware architecture that implements encryption, decryption and authentication functions independently for each data channel so that these functions may be configured, and controlled independently of other data channels.

Yet another object is, in a communication terminal, to implement the TCP protocol in a dedicated MCU running only TCP or TCP/IP if the user application for one or more user channels requires TCP/IP. (Data channels not requiring software are still implemented entirely in independent deterministic hardware circuits.)

According to a further aspect of an exemplary embodiment, the User Datagram Protocol (UDP) and the associated Internet Protocol (IP) may be implemented in deterministic hardware circuits only, and the TCP functionality may be implemented in (but is not limited to) software only. As a result, the pure deterministic hardware circuit solution described herein may be applied to the IP functionality associated with the TCP functionality, and the TCP functionality may be implemented in software by using the MCU. According to this aspect of the exemplary embodiment, a dedicated processor executes only the minimum required TCP protocol functionality in software, while optionally executing the IP portion of the TCP/IP protocol either in software or in deterministic hardware circuits. While this approach does involve passing user data through real time software, said software runs in its own dedicated processor, may not require an RTOS, and remains entirely independent of any other real time software. Use of a dedicated processor for a single instance of TCP or TCP and IP minimizes the usual real time software problems associated with multiple software functions asynchronously competing for the opportunity to execute, and thus minimizes the likelihood of loss or corruption of user data or possible system crash. Even should the TCP software crash, it has no effect on any other function and can be immediately restarted automatically.

Throughput bottlenecks resulting from multiple, asynchronous, simultaneous demands on the processor's resources are also minimized, thereby increasing available user bandwidth compared to an all software implementation. If multiple TCP channels are required, then such channels are isolated from each other by implementing each in its own processor. This should preserve the certification, bandwidth and reliability advantages of one task per processor described above.

Yet another object is, in a communication terminal, to implement any process that requires use of software as opposed to deterministic hardware circuits in a dedicated processor, in the same manner as that described above for the TCP protocol implemented in software. (Data channels not requiring software are still implemented entirely in independent deterministic hardware circuits, and the TCP protocol might also be implemented in deterministic hardware circuits).

Use of an independent processor dedicated to any single task presents the same advantages as described above for the TCP protocol implemented in software. If multiple software functions are required, but can logically be executed as independent tasks, then such tasks can be isolated from each other by implementing each in its own processor. This preserves the certification, bandwidth and reliability advantages of one task per processor described in the previous paragraph.

Still another object is, in a communication terminal, to assure that in the event of software or hardware failure of an administrative processor that is used to initially configure the previously described deterministic hardware circuit transporting user data, said deterministic hardware circuit will continue operating properly to deliver user data between such communication terminals.

The aforesaid objects are achieved individually and in combination and it is not intended that the present invention be construed as requiring two or more of the objects to be combined unless expressly required by the claims attached hereto.

Use of the term 'module' or 'modular' herein refers to partitioning of a system into repetitive similar hardware circuits with or without being combined with an MCU; it neither requires nor precludes physically separable implementations of said circuits. Further, use of the term 'module' or 'modular' herein does not preclude inclusion of one or more instances of the said modular circuitry, optionally along with other circuitry, on a single PCB or other physically non-modular implementation.

With the foregoing objects in mind, in accordance with one aspect of the invention a modular deterministic communication terminal is provided which includes a communications terminal having at least one deterministic hardware module and at least one modem or other wired or wireless remote communication link for communication with one or more distant similar or compatible communication terminals. A multiplexing mechanism is provided to interconnect multiple logic modules to each other and to one or more modems or other wired or wireless remote communication links. A multiplexing mechanism is also provided within each module to interconnect communication ports on that module. One or more logic modules may also be connected to various subsystems within the terminal for the purpose of monitoring subsystem status, overall terminal or subsystem temperature monitoring, fan and/or heating control and similar auxiliary or housekeeping functions.

In accordance with a further aspect of the invention, an admin processor may optionally be connected to set operating parameters, e.g., of the deterministic hardware circuits, under user control. Said admin processor may also perform some or all of the previously mentioned housekeeping functions in software instead of hardware. Careful partitioning of tasks between hardware and software will allow the terminal to continue its primary function of communicating user data, even in the event of failure of admin processor hardware or software.

In accordance with a further aspect of the invention, each logic module may be equipped with at least one Field Programmable Gate Array (FPGA), or with any other type of equivalent programmable logic device or custom integrated circuit, with the capacity to be configured as needed to perform the required user channel or auxiliary functions. Logic modules may optionally be equipped with one or more common physical interfaces including but not limited to logic level parallel and serial; wired, wireless or fiber Ethernet (IEEE 802.3); other (collectively referred to herein as physical interfaces). If not located on the logic module, such physical interfaces may be located elsewhere in the terminal, including in a common pool for use by any logic module as required.

In accordance with a further aspect of the invention, the programmable logic devices on logic modules are configured to perform one or more of the following functions, including but not limited to Ethernet Media Access Controller (MAC), IP, UDP, Random Access Memory (RAM), dual port RAM, First In First Out (FIFO) buffer, Universal Asynchronous Receiver/Transmitter (UART), Universal Synchronous/Asynchronous Receiver/Transmitter (USART), Universal Serial Bus (USB), I$^2$C, Mil-Std-1553, ARINC-429, encryption, decryption, and authentication. A microprocessor or microcontroller may optionally be incorporated inside or external to the programmable logic device(s), dedicated to performing a higher level function such as TCP. Logic level input/output (I/O) and general purpose logic are included in the programmable logic device(s) to connect with physical interfaces on and off the module, implement TDM, or perform in hardware such higher level but deterministic functions as multiplexing and de-multiplexing local or remote terminal administration information embedded in a user data stream, or translation of navigation information for aiming an antenna.

In addition, according to a further aspect of the invention, multiplexing mechanisms are provided that connect the logic modules to one or more modems, or other wired or wireless remote communication links, can include but are not limited to Ethernet switches, TDM hardware or USB hubs. Each logic module may independently be connected through the multiplexing mechanism to one or more of the remote communication links.

Various other subsystems such as video or voice compression/decompression or Voice over Internet Protocol (VoIP) may be included in the terminal as required. Interfaces not included on logic modules, and other specialized functions may be implemented external to the logic module as required.

The features described in combination above may also be used independently.

The above and still further features and advantages of the present invention will become apparent upon consideration of the definitions, descriptions and descriptive figures of specific embodiments thereof set forth herein. In the detailed description below, like reference numerals in the various figures are utilized to designate like components and elements, and like terms are used to refer to similar or corresponding elements in the several embodiments. While these descriptions go into specific details of the invention, it should be understood that variations may and do exist and would be apparent to those skilled in the art in view of the following description.

DESCRIPTION OF EXEMPLARY EMBODIMENTS

The specific parameters and dimensions set forth below are by way of example for particular embodiments to assist in an understanding of the illustrated structure; these parameters and dimensions are not to be construed as limiting the scope of the invention.

A Modular Deterministic Communication Terminal, preferably for use to establish a communication link between a manned control point and an unmanned remote system such as an Unmanned Aerial Vehicle (UAV), includes one or more deterministic hardware circuits which may represent, or may be incorporated in, one or more deterministic hardware modules, associated interface circuits appropriate to the user's application and one or more modems or other communication link components. Additional components associated with the communication link may include antennas, high power amplifiers, diplexers, low noise amplifiers and other RF components. The use of modular hardware architecture does not require mounting each modular circuit on a separate printed circuit board (PCB), but allows such modular design components to all be mounted on one or more common PCBs or in any other physical configuration, while still accomplishing the principle purpose of reusing tested and proven deterministic hardware circuits to replace software in the data path and deliver data to the distant end in a deterministic manner.

Figure 1:
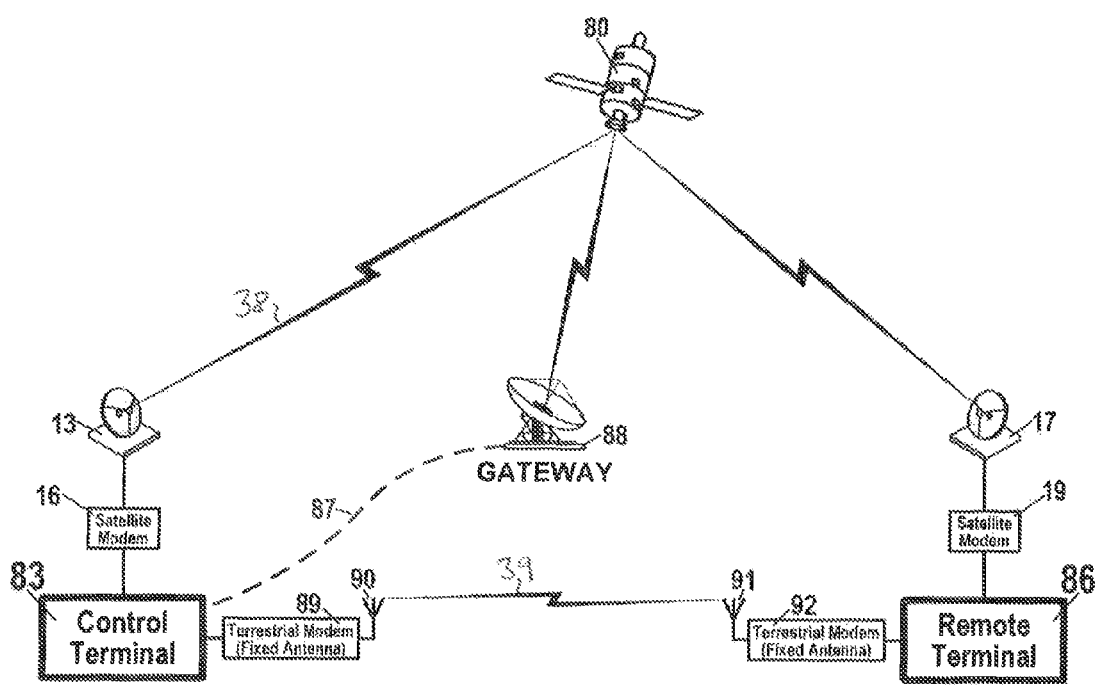
FIG. 1 is a schematic block diagram showing a Control Terminal and a Remote Terminal, interconnected by various Wide Area Network (WAN) communication facilities according to an exemplary embodiment.

FIG. 1 is a schematic block diagram showing a typical application of a pair of Modular Deterministic Communication Terminals according to an exemplary embodiment, including a Control Terminal and a Remote Terminal, interconnected by various WAN communication facilities, including satellite modems with directional antennas, optional direct connection to a satellite gateway and modems with omnidirectional fixed antennas for terrestrial communications.

The term "WAN" refers to modem or terrestrial WAN connections to the terminal at the other end of the communication links. While the Control Terminal is typically located in a fixed or portable location, Control and Remote Terminals can be used in either fixed or vehicular applications, including installation on land, water, air or space vehicles. FIG. 1 illustrates an application with a fixed location Control Terminal and a movable Remote Terminal that incorporates both satellite and terrestrial communications, as used, for example, in an Unmanned Aircraft System (UAS).

Referring to FIG. 1, Control Terminal 83 communicates with Remote Terminal 86 through one or more WAN communication facilities, including 1) a satellite connection through Satellite Modem 16, directional antenna 13, satellite 80, directional antenna 17 and Satellite Modem 19; 2) a satellite connection through optional direct WAN connection 87 to satellite gateway 88, satellite 80, directional antenna 17 and Satellite Modem 19; 3) a terrestrial connection through terrestrial modem 89, omnidirectional fixed antenna 90, omnidirectional fixed antenna 91 and terrestrial modem 92. While this exemplary embodiment shows a system with a mixture of omnidirectional fixed antennas and directional antennas that must be aimed, a Modular Deterministic Communication Terminal may also contain or operate with any combination of modems and associated antennas appropriate to the application.

The expression 'Terrestrial' modem is used herein to denote non-satellite communications equipment. A 'Terrestrial' modem may include equipment for communicating via direct line of sight or through fixed or mobile repeaters. Such equipment may also be used for other direct line of sight and repeater applications, including communications with or between spacecraft.

Figure 2:
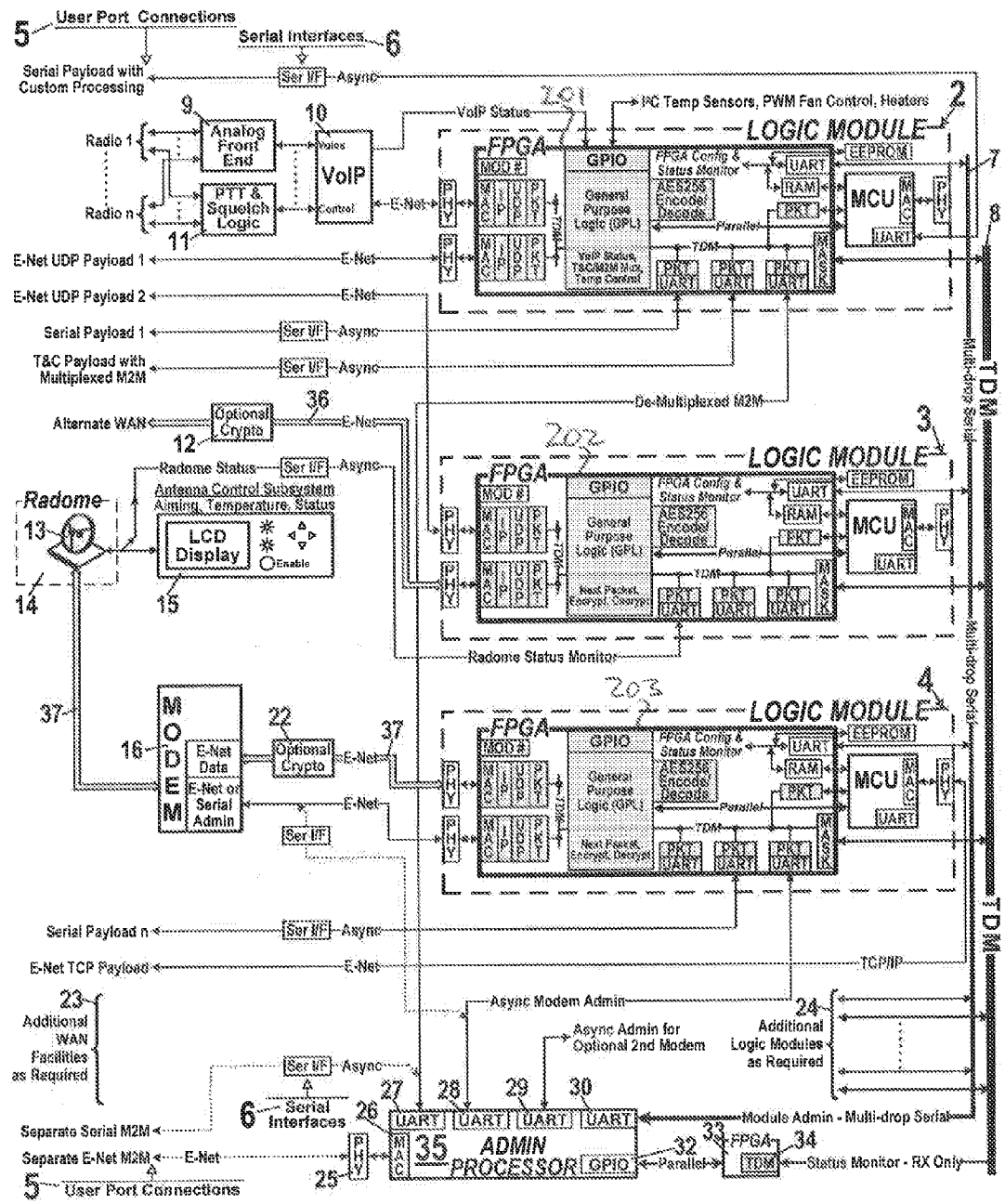
FIG. 2 is a schematic block diagram of a control implementation of a Modular Deterministic Communication Terminal according to an exemplary embodiment.

FIG. 2 is a schematic block diagram of a control implementation of a Modular Deterministic Communication Terminal according to an exemplary embodiment using Time Division Multiplexing of user data carried by data channels into a satellite modem and an alternate WAN connection.

In an exemplary embodiment, a manually controlled setup mechanism for aiming the antenna at the satellite and monitoring antenna status may be included. Provision for additional modems and logic modules is shown in FIG. 2 to accommodate additional WAN connections. Any unused ports on existing logic modules are available for user data, and additional modules can be added for that purpose.

Figure 3:
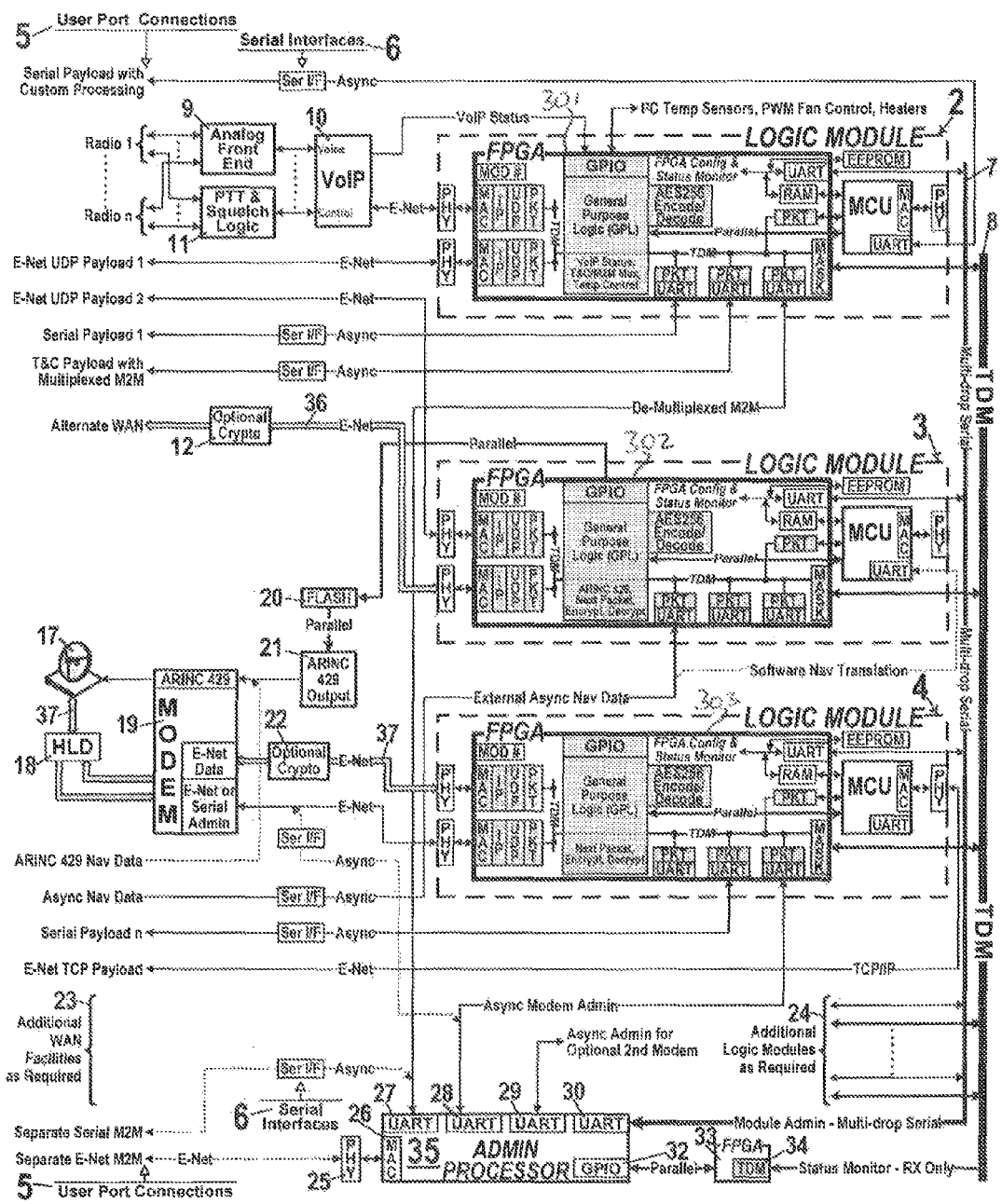
FIG. 3 is a schematic block diagram of a remote vehicular implementation of a Modular Deterministic Communication Terminal according to an exemplary embodiment.

FIG. 3 is a schematic block diagram of a remote vehicular implementation of a Modular Deterministic Communication Terminal according to an exemplary embodiment using Time Division Multiplexing of user data carried by data channels into a satellite modem. Logic for keeping the antenna aimed at the satellite while the vehicle is in motion is also included. The elements shown in FIG. 3 are is substantially identical to the elements shown in FIG. 2 except that FIG. 3 shows a version of a Modular Deterministic Communication Terminal intended to operate while in motion.

Figure 4:
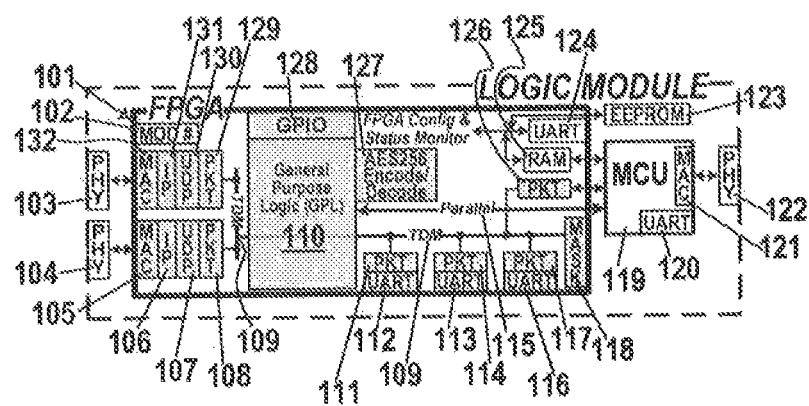
FIG. 4 is a schematic block diagram of a deterministic hardware logic module according to an exemplary embodiment.

FIG. 4 is a schematic block diagram of a deterministic hardware logic module according to an exemplary embodiment, a component of a Modular Deterministic Communication Terminal incorporating one or more programmable logic devices and one or more Ethernet physical interface (PHY) circuits which include Ethernet transformers. Also incorporated is a Micro Controller Unit (MCU) for optional use where software must be used. In this case, all operations performed by the MCU may be performed in Software only, i.e., the operations may be performed by Software routines, whereas all operations performed by the deterministic hardware circuits may only be performed by hardware without any involvement of any software routines during execution of the operations.

In FIGS. 2-4, shaded functions within the deterministic hardware circuits 101, 201-203, and 301-303, that may be implemented as FPGA, are configurable by admin commands. Packet logic (PKT) may include Dual Port RAM and TDM time slot logic for TX and RX. General Purpose Logic (GPL) is provided to implement special functionality and may include Dual Port RAM and TDM time slot logic for TX & RX. General Purpose Input/Output (GPIO) provides serial or parallel interfaces to devices external to the logic modules. Ethernet Physical Interface (PHY) circuits include transformers. Serial Interface (Ser I/F) circuits perform EIA-232, EIA-422 or similar logic level conversion. Dashed signal lines denote alternate implementations. Thick signal lines denote TDM bus, serial bus or parallel paths.

Referring to FIGS. 2-4, Control and Remote Terminals both may include one or more logic modules 2, 3 and 4, which communicate user and housekeeping data via TDM Bus 8 amongst themselves and to Admin Processor 35. Logic modules 2, 3 and 4 interface with user applications via User Port Connections 5 and appropriate electrical circuitry such as Serial Interfaces 6 connected to Universal Asynchronous Receiver Transmitters (UARTs) 112, 113, and 116 within deterministic hardware circuit 101, which may form logic modules 2, 3 and 4 or which may be part of each of the logic modules 2, 3 and 4. In other words, some or all logic modules 2, 3 and 4 in the Control and Remote Terminals may be implemented only by deterministic hardware circuits without MCUs (not shown). Ethernet circuits at User Port Connections 5 access Ethernet physical interfaces (PHYs) 103, 104 and 122 in logic modules 2, 3 and 4. Voice over Internet Protocol (VoIP) COder DECoder (CODEC) 10 can also access Ethernet physical interfaces (PHYs) 103, 104 or 122 in logic modules 2, 3 or 4. General Purpose Input Output (GPIO) parallel interface circuitry 128 on each logic module 2, 3 and 4 is available for connection of other types of interfaces. Additional electrical or logical interfaces may be part of or separate from a logic module as required.

In an exemplary embodiment, the deterministic hardware circuit 101 may be implemented as Field Programmable Gate Arrays (FPGA). Predesigned and tested implementations of standard logic functions in the related art are readily available from many vendors for implementation in FPGA. These vendors provide the following functions, among others: Universal Asynchronous Receiver Transmitter (UART), Ethernet Media Access Controller (MAC), Internet Protocol (IP) stack, User Datagram Protocol (UDP) stack, AES 256 encryption and decryption, and Cryptographically Secure Pseudorandom Number Generator (CSPRNG). This invention makes extensive use of such implementations in the related art to reduce the technical risk and the burden of proving reliable and deterministic behavior to certification authorities.

In an exemplary embodiment, General Purpose Logic (GPL) 110 in deterministic hardware circuit 101 in any logic module 2, 3 or 4 may also be used to perform ancillary user functions such as customer specific multiplexing and de-multiplexing of machine to machine (M2M) commands and responses into and out of data streams, or translation of customer specific navigation information into industry standard ARINC-429 format for use in aiming an airborne antenna.

Due to the parallel nature of the deterministic hardware circuits 101, 201-203 and 301-303 within these logic modules, these ancillary functions may be performed simultaneously with each other and with user data transmission functions, without interference with each other or with user data or impact on user data throughput, subject only to the availability of appropriate hardware resources within the deterministic hardware circuit(s) 101, such as in FPGA, or elsewhere within logic modules 2, 3 or 4. GPL 110 and GPIO 128 can also be simultaneously used, without user data interference, for housekeeping functions including VoIP status and temperature monitoring and control of fans and heaters, as shown with logic module 2.

Deterministic hardware circuits 202 and 203 in logic modules 3 and 4 connect Control Terminal (FIG. 2) to one or more Remote Terminals (FIG. 3) via WAN facilities. In an exemplary embodiment, deterministic hardware circuit 203 in logic module 4 of the Control Terminal shown in FIG. 2 may establish communication link 37 to deterministic hardware circuit 303 in logic module 4 of the Remote Terminal shown in FIG. 3, including satellite modems 16 and 19. In accordance with this exemplary embodiment, hardware circuit 202 in logic module 3 of the Control Terminal shown in FIG. 2 may establish communication link 36 to deterministic hardware circuit 302 in logic module 3 of the Remote Terminal shown in FIG. 3, including terrestrial modems 89 and 92, and fixed antennas 90 and 91, as shown in FIGS. 1-3.

In another exemplary embodiment, deterministic hardware circuits in logic modules of the Control Terminal shown in FIG. 2 may establish further alternate communication link(s) to deterministic hardware circuits in logic modules of the Remote Terminal shown in FIG. 3, including Alternate WAN facilities 87 and 88, as shown in FIG. 1.

If the application in this exemplary embodiment requires the Control Terminal to use both alternate WAN facilities 87 and 89, shown in FIG. 1, additional deterministic hardware circuits in an additional logic module 24 may be required in the Control Terminal and/or in the Remote Terminal.

The functionality of Control Terminals and Remote Terminals in most applications may be substantially identical except for their WAN connections. In an exemplary embodiment of an application to an Unmanned Aircraft System (UAS), the modems, antennas and associated functionality constitute the principle differences between Control Terminals (FIG. 2) and Remote Terminals (FIG. 3). Since most functionality is common to both Control and Remote Terminals, these few differences will be detailed below.

Modular Deterministic Communication Terminals typically contain or are closely associated with one or more satellite modems 16 (FIG. 2) or 19 (FIG. 3) for communication with one or more such terminals through a satellite 80 (FIG. 1). These satellite modems typically are associated with antennas 13 (FIG. 2) or 17 (FIG. 3).

The Remote Terminal in FIG. 3 shows an exemplary embodiment of a system that includes proprietary (non-standard) asynchronous serial navigation data (Async Nav Data) input at User Port Connections 5 and connected through a serial interface 6 to UART 112 in logic module 3. Logic in GPL 110 and GPIO 128 within logic module 3 translates the non-standard navigation data into addresses that control Flash memory 20 to select appropriate industry standard ARINC-429 messages for transmission by ARINC-429 Output circuit 21 for use by modem 19 and airborne antenna 17 to update the direction that antenna 17 is pointing relative to the aircraft to keep the antenna constantly pointed at satellite 80 (FIG. 1). The Remote Terminal in FIG. 3 also includes High Power Amplifier/Low Noise Amplifier/Diplexer (HLD) 18, as typically required by airborne satellite modems but not typically required by satellite modems used in ground installations.

Terminals in fixed locations in which the antenna remains pointed at a fixed point, including most ground applications with geostationary satellites, do not need the constantly updated pointing functionality described above. The Control Terminal shown in FIG. 2 includes an Antenna Control Subsystem 15 which is used to manually aim Antenna 13 prior to flight. Antenna 13 is enclosed in Radome 14 for environmental protection. Antenna Control Subsystem 15 monitors and controls Radome 14 temperature and status and reports status through UART 112 within logic module 3 to Admin Processor 35 via TDM Bus 8. Antenna Control Subsystem 15 may be implemented entirely in deterministic hardware, or it may be partially implemented in hardware for such functions as Radome 14 temperature monitoring and control, while using software in a dedicated embedded processor for only those tasks which are not required during flight operations, such as a compass display of the direction in which the antenna is pointed.

Modular Deterministic Communication Terminals typically contain an Admin Processor 35, whose principal purpose is, prior to flight, configuring logic modules and modems for automatic continuous operation according to the user's requirements. Examples of application specific items to be configured in modem 16 or 19 by Admin Processor 35 may include source and destination IP addresses, source and destination UDP port numbers, streaming bit rates, RF channel selection and other details unique to the modem. Examples of items to be configured in logic modules 2, 3 and 4 by Admin Processor 35 may include transmit and receive time slot assignments for each active port, source and destination IP addresses, UDP source and destination port numbers, UART Baud rates, destination logic module and the particular port on that destination module, encryption on/off selection, and loading and selection of desired encryption key material. These commands may also be stored in Electrically Erasable Programmable Read Only Memory (EEPROM) 123 on each logic module 2, 3 and 4. Once appropriate admin commands have been issued by Admin Processor 35, logic modules and modems operate autonomously, requiring no further involvement by Admin Processor 35. Admin Processor 35 may monitor operation of the system if desired, but continued operation of Admin Processor 35 is not required for ongoing communications. Should the terminal be restarted due to power failure or other expected or unexpected event, deterministic hardware circuit 101 logic automatically reloads the most recent configuration settings stored in EEPROM 123. Should admin processor 35 not be operating properly, the terminal will resume normal operation using these settings previously stored in EEPROM 123 on logic modules 2, 3 or 4. Similarly, modem 16 or 19 will resume operation using previously stored configuration settings.

Admin Processor 35 also provides a separate machine to machine (M2M) interface for direct user control and monitoring of the Modular Deterministic Communication Terminals instead of or in addition to said control and monitoring being multiplexed into a user data channel as described above.

Data Path Through Terminals

The expression 'internal packet' is used herein to designate packets of user data constructed by a Modular Deterministic Communication Terminal for the purpose of transporting such user data only within and between such Modular Deterministic Communication Terminals and may not include packets that are part of user data transmitted to another Modular Deterministic Communication Terminal. Internal packets may contain other packetized data as payload. Internal packet headers and trailers are constructed around incoming user data at the incoming user port and are removed at the outgoing user port by internal packet logic (PKT) 108, 111, 114, 117, 126 or 129 as required and described below. This packet logic is usually configured to be transparent to data for use only within the local terminal, i.e. not for transmission to a distant terminal.

Asynchronous serial user data connections appearing at User Port Connections 5 are connected through serial electrical interfaces 6 to USARTs 111, 113 or 116 and thence to internal packet logic (PKT) 111, 114 or 117 in logic modules 2, 3 or 4.

Ethernet data connections appearing at User Port Connections 5 are connected through Ethernet PHYs 103 or 104 (including associated Ethernet transformers), Media Access Controllers (MACS) 105 or 132, Internet Protocol (IP) stacks 106 or 131, User Datagram Protocol (UDP) stacks 107 and 130 and internal packet logic (PKT) 108 or 129 in logic modules 2, 3 or 4. Ethernet from VoIP module 10 can be connected to logic modules 2, 3 or 4 as described here for Ethernet appearing at user port connections 5.

Audio for one or more two way radios connected to User Port Connections 5 may be passed through Analog Front End 9 for signal processing, including setting input/output impedances and matching input/output levels over a wide range for connection to a wide variety of user radios. Push to Talk (PTT) and Squelch signaling may be connected through PTT and Squelch logic 11 for level conversion to match the user application. PTT and Squelch logic 11 may also include provision for enabling or disabling the input. Analog front end 9 and PTT and Squelch Logic 11 may connect to Voice over Internet Protocol (VoIP) subsystem 10, which uses UDP over Ethernet to deliver two-way VoIP to PHY 103 on logic module 2 as described above for Ethernet appearing at User Port Connections 5.

VoIP Subsystem 10 may also embed PTT and squelch signaling in the VoIP bit stream using standard telephone E&M signaling, so that PTT and squelch signaling remain synchronized with the audio. In an exemplary embodiment, two way radios may be located at a Remote Terminal and controlled by people located at a Control Terminal; therefore, PTT signaling may be an input to a Control Terminal and an output from a Remote Terminal. Conversely, Squelch signaling may be an input to a Remote Terminal and an output from a Control Terminal.

In another exemplary embodiment, PTT & Squelch Logic 11 may enable the audio path into VoIP Subsystem 10 only when the input to PTT & Squelch Logic 11 is active. When the input is not active, VoIP Subsystem 10 may be arranged to send only the minimum number and size packets required to maintain proper end to end VoIP operation. This exemplary embodiment saves bandwidth during channel idle time. A status signal from VoIP subsystem 10 may also be connected to GPIO 128 on logic module 2. This provides a means for the Admin Processor 35 to monitor the status of VoIP subsystem 11 by way of TDM Bus 8.

Other physical, electrical, or logical interfaces may be connected through such additional circuitry as necessary, located separately or included within such logic module 2, 3 or 4. Such special interfaces may be connected to parallel or serial functionality incorporated in GPIO 128 on any logic module 2, 3 or 4. All data described thus far is therefore passed through entirely deterministic hardware, optionally including general purpose logic 110 in deterministic hardware circuit 101 on logic module 2, 3 or 4, the application and use of which is explained more fully below.

TABLE I

Packet Details

| HEADER [5-17 Bytes] | PAYLOAD DATA [1->1400 Bytes (TBD)] | TRAILER [1 Byte] |
|---|---|---|

Bit values in (parentheses) are fixed literals.

HEADER

| Byte | Bit8 | Bit7 | Bit6 | Bit5 | Bit4 | Bit3 | Bit2 | Bit1 | Bit0 |
|---|---|---|---|---|---|---|---|---|---|
| 0 | (1) Packet Flag | (0) Packet Start Flag | 1 = Pkt Complete Flag | 1 = Packet Invalid | reserved | 1 = Dest IP Present | 1 = Source IP Present | Crypto: 0 = Not encrypted, 1-3 = Key Select | |
| 1 | 0 | Origin: 1 = Remote | reserved | Source Module Port: 0-3f | | | | | |
| 2 | 0 | Dest: 1 = Remote | reserved | Destination Module Port: 0-3f | | | | | |
| 3 | 0 | Destination Module Number: 0-f | | | | Source Module Number: 0-f | | | |
| 4 | 0 | Packet Sequence Number | | | | | | | |
| 5 | 0 | UDP Source Port LSB | | | | | | | |
| 6 | 0 | UDP Source Port MSB | | | | | | | |
| 7 | 0 | UDP Destination Port LSB | | | | | | | |
| 8 | 0 | UDP Destination Port MSB | | | | | | | |
| 9 | 0 | Source IP Address, Byte 0 | | | | | | | |
| 10 | 0 | Source IP Address, Byte 1 | | | | | | | |
| 11 | 0 | Source IP Address, Byte 2 | | | | | | | |
| 12 | 0 | Source IP Address, Byte 3 | | | | | | | |
| 13 | 0 | Destination IP Address, Byte 0 | | | | | | | |
| 14 | 0 | Destination IP Address, Byte 1 | | | | | | | |
| 15 | 0 | Destination IP Address, Byte 2 | | | | | | | |
| 16 | 0 | Destination IP Address, Byte 3 | | | | | | | |

Bit values in (parentheses) are fixed literals.

TRAILER

| Byte | Bit8 | Bit7 | Bit6 | Bit5 | Bit4 | Bit3 | Bit2 | Bit1 | Bit0 |
|---|---|---|---|---|---|---|---|---|---|
| 0 | (1) Packet Flag | (1) Packet End Flag | reserved | reserved | reserved | Unused Bytes in Last 16 Byte Block: (0-f) | | | |

All user data carried by data channels entering a logic module 2, 3 or 4 as described above, may pass through internal packet logic (PKT) 108, 111, 114, 117, 126 or 129 to internal TDM bus 109 inside deterministic hardware circuit 101 on logic module 2, 3 or 4. Internal packet logic is also implemented within General Purpose Logic (GPL) 110 as needed for additional or special user interface or other functionality, the application and use of which is explained more fully below. TDM bus 109 also extends within GPL 110 as needed for access by aforesaid internal packet logic for special functions. For user data that is to be sent to another terminal, internal packet logic constructs a packet consisting of a header, one or more bytes of data and a trailer. This packetized data is held in internal packet logic until the packet is complete and the trailer has been appended after the last byte of data; the entire packet is then delivered to one or more preconfigured destination ports via TDM. Some data does not need to be packetized; it is immediately delivered via TDM to a fixed destination port within the originating logic module 2, 3 or 4 or another module in the local terminal, via TDM bus 8, as each byte is received, without a header or trailer. Data to be sent to another terminal must be packetized. See Table I for packet details.

TDM bus 109 is internal to logic in each module 2, 3 or 4; it is synchronized with and operates as an extension of TDM bus 8 so that data on TDM bus 109 in each logic module 2, 3 or 4 is transferred within and between logic modules 2, 3 or 4 via TDM bus 8. TDM bus 109 and TDM bus 8 share the same simultaneous time slots except as inhibited by MASK logic 118 which isolates a configurable portion of these time slots so that internal TDM bus 109 time slots in each logic module 2, 3 and 4 can be used independently from each other. This isolation consists of disconnecting TDM bus 109 from TDM bus 8 during the time slots configured to be masked. This masking allows each logic module's TDM bus 109 to reuse, internal to each individual logic module, this isolated portion of the available time slots. TDM bus 8 operates at a data rate that provides several multiples of the bandwidth needed to deliver the worst case total aggregate data rate required by the user's application.

Internal packets destined for delivery to a distant terminal are passed via TDM to one or more sets of next packet selection and distribution logic associated with a WAN port; this logic also incorporates encryption and decryption logic, and is described in more detail below with regard to FIG. 5. If the next packet selection and distribution logic is within the same logic module 2, 3 or 4 as the user data port from which the data originates, the data travels only on the internal TDM bus 109 within the current module. If the next packet selection and distribution logic is in a different logic module 2, 3 or 4, the data is passed via internal TDM bus 109 to TDM bus 8, thence to TDM bus 109 within the appropriate logic module 2, 3 or 4 to the next packet selection and distribution logic and thence to the WAN port connected to the WAN facility, as further described below. WAN data may be passed through optional crypto devices 12 and 22, independent of logic modules 2, 3 or 4, mounted inside or outside the terminal enclosure. This exemplary embodiment may be used if the application requires use of standalone encryption equipment for operational security reasons.

A sufficient number of time slots may be assigned to each TDM interface in logic module 2, 3 or 4 to provide the bandwidth required to accommodate the maximum throughput required for a particular interface or modem, without possibility of congestion.

Momentary congestion may be avoided by the use of dual port RAM implemented as a FIFO buffer associated with each packet logic instance. This FIFO function is always in the data path, even when the rest of the packet logic is bypassed for data traveling only within the local terminal.

Thus, all user data connected to logic modules 2, 3 or 4 is connected through deterministic hardware circuits without passing through a processor, to one or more modems 16 or 19, and/or to alternate WAN facility 87 and/or 89 (FIG. 1). Conversely, data received from WAN facilities is connected as described above to user ports in the same fashion.

Internal Packet Logic (PKT)

Internal packets are used to transfer data between Modular Deterministic Communication Terminals. Internal packets are constructed (and removed at the destination port) by internal packet logic (PKT) 108, 111, 114, 117, 126 and 129 at incoming data ports and carried on TDM bus 109 (inside deterministic hardware circuit 101) and TDM bus 8 (FIGS. 2 and 3) through the local Modular Deterministic Communication Terminal, through a WAN communications facility to a distant Modular Deterministic Communication Terminal and through the distant Modular Deterministic Communication Terminal to an outgoing user port. Internal packet headers and trailers are removed by internal packet logic 108, 111, 114, 117, 126 and 129 at the destination user ports.

Internal packet logic may be configured under admin control to construct a packet in response to any of several conditions, including the following: After receipt of a configured byte count, after a configured time has elapsed, after a specified single character or a two character sequence such as carriage return, line feed (CR LF), or after receipt of packet complete status from other logic such as a UDP protocol stack. Internal packet logic can also be configured to remain transparent and not add any header or trailer, as in the case of local housekeeping data which does not require packetization, or at an incoming WAN port in which a distant terminal has already inserted the internal packet header and trailer. In this exemplary embodiment, the incoming data at a port may be transmitted to its destination without waiting for a packet to be assembled.

Internal packet logic is constructed around dual port Random Access Memory (RAM) instantiated in deterministic hardware circuit 101. This dual port RAM is implemented as a FIFO buffer, with the internal packet logic having access to the input and output of such buffer for the purpose of inserting several header bytes ahead of incoming data and appending one or more trailer bytes after the last byte of a packet is entered into the dual port RAM.

Internal packet logic also sets a Packet Complete Flag bit in the header after the entire packet has been received and entered into the FIFO. Internal packet logic also may enter into the trailer of the number unused bytes in the last 16 byte block. This information may be required by some encryption implementations. See Table I for details. The FIFO function is always in the data path as a buffer to prevent momentary congestion, even when the rest of the packet logic is bypassed.

UDP provides no means of detecting or ameliorating duplicate or missing packets. In an exemplary embodiment, an internal packet sequence number (Table I) may be inserted and incremented by one for each subsequent internal packet, into the internal packet header transmitted with each user input port. This sequence number may be incremented independently for each data channel. (Said sequence number may automatically be removed as part of the normal removal of internal packet headers and trailers by internal packet logic (PKT) 108, 111, 114, 117, 126 and 129 at the receiving user output port at the distant end.) It is therefore possible, if so configured by admin command, to detect and remove any duplicate packets received. If the packet numbers are passed to subsequent logic or external user software, it is further possible to recognize the occurrence of missing packets. These functions can be performed by internal packet logic (PKT) 108, 111, 114, 117, 126 and 129.

Next Packet Selection, Encryption/Decryption, Packet Distribution

Figure 5:
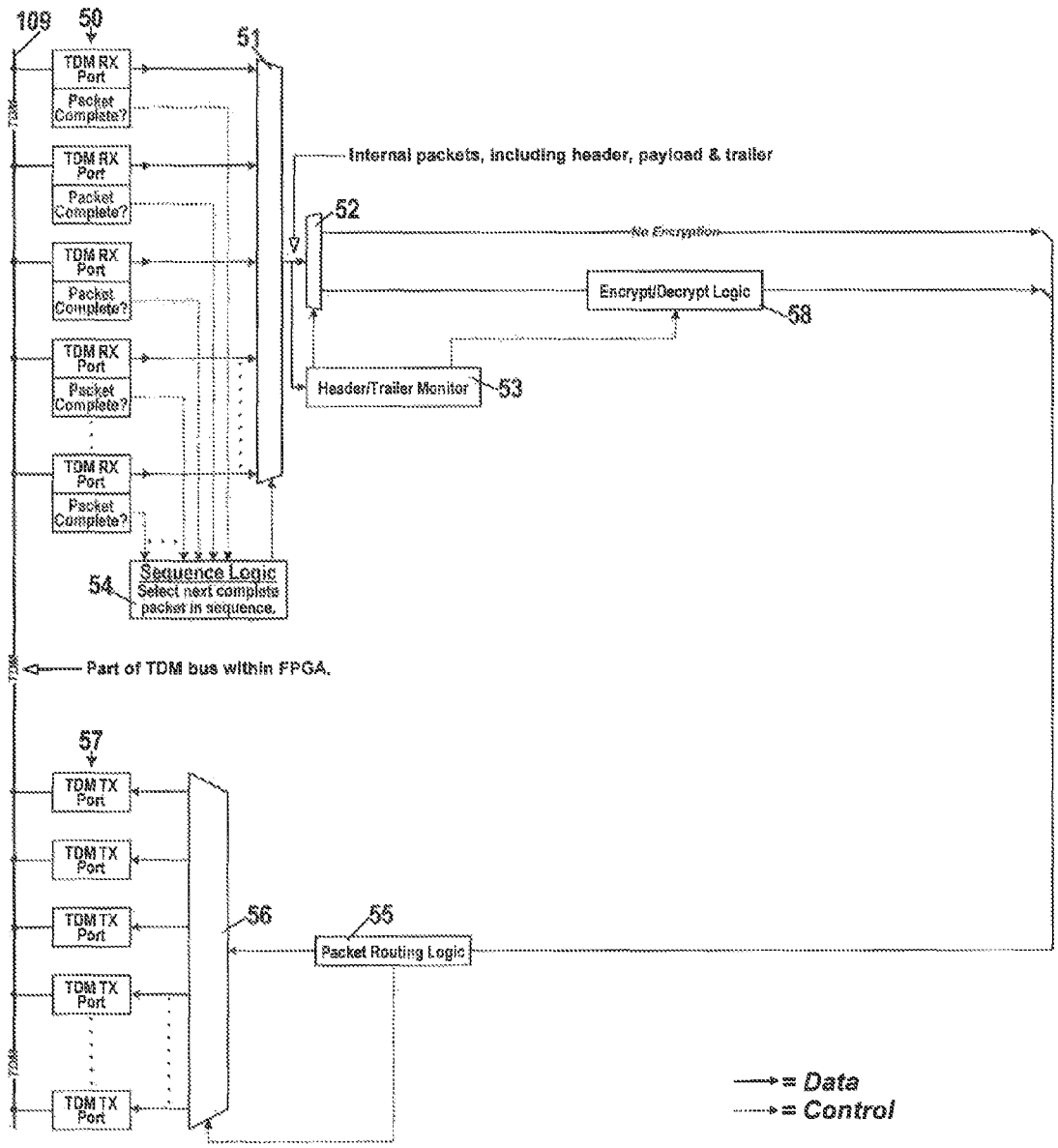
FIG. 5 is a schematic block diagram illustrating selection of the next sequential complete internal packet received from user ports according to an exemplary embodiment.

FIG. 5 is a schematic block diagram illustrating selection of a next sequential complete internal packet received from user ports according to an exemplary embodiment, performing encryption if required, and sending said packet to a WAN facility for transmission to a remote terminal. Internal packets are likewise received from a WAN facility, decrypted if required and distributed to the appropriate user ports.

In an exemplary embodiment, TDM TX ports 50 and TDM RX ports 57 include dual port RAM and configurable TDM time slot logic for TX and RX, respectively. One TDM RX port receives packets from the incoming WAN port. Remaining TDM RX ports collect incoming user packets for the outgoing WAN port. Packet Complete Logic sets Packet Complete Flag (PCF) bit in header when trailer byte is received. PCF indicates complete packet to Sequence Logic, which selects next packet.

One TDM TX port sends outgoing packets to the WAN port. Remaining TDM TX ports distribute incoming WAN packets to destination user ports. Packet Complete Logic sets Packet Complete Flag (PCF) bit in header when trailer byte is received, thus enabling TDM TX port for transmission during designated time slot(s).

In the exemplary embodiment illustrated in FIG. 5, one copy of the logic may be implemented in GPL 110 for each WAN port. TDM receiving (RX) ports 50 are configured to receive only those internal packets destined for delivery to a particular WAN port associated with a communications facility to/from a distant terminal. One TDM RX port 50 is configured to receive incoming internal packets from the WAN port connected to the WAN facility from said distant terminal. User packets are delivered via TDM bus 109 from incoming user or WAN ports 103, 104, 112, 113, 116 or 122 and associated internal packet logic 129, 108, 111, 114, 117 or 126 in any logic module 2, 3 or 4 in the local terminal. TDM bus 8 carries internal packets between logic modules 2, 3 or 4 in the local terminal as required.

TDM RX ports 50 detect receipt of an internal packet trailer and notify sequence logic 54 that this TDM RX port 50 has received a complete internal packet that is waiting to be further processed. Sequence logic 54 sets multiplexer 51 to deliver the next sequential complete packet to header/trailer monitor 53 and de-multiplexer 52. In this fashion, sequence logic 54 provides deterministic routing of internal packets in the order in which they are received by TDM RX ports 50. If the crypto bits in the header (Table I) are set to zero, indicating that no encryption or decryption is required, header/trailer monitor 53 sets de-multiplexer 52 to pass the next sequential packet, as selected by multiplexer 51, directly to packet routing logic 55, bypassing encrypt/decrypt logic 58.

If header/trailer monitor 53 determines that the crypto bits in the header (Table I) are set to a non-zero value, indicating that encryption or decryption may be required, and from the origin and destination bits in the header that the internal packet originated in this local terminal and is destined for a distant terminal, indicating that encryption is required, header/trailer monitor 53 sets de-multiplexer 52 to pass the next sequential packet, as selected by multiplexer 51, through encrypt/decrypt logic 58 and thence to packet routing logic 55. Header/trailer monitor 53 may also pass an encryption indication and the crypto bits from the header to encrypt/decrypt logic 58, causing said logic to encrypt the internal packet using the selected key material.

If header/trailer monitor 53 determines that the crypto bits in the header (Table I) are set to a non-zero value, indicating that encryption or decryption may be required, and from the origin and destination bits in the header that the internal packet originated in a distant terminal and is destined for this local terminal, indicating that decryption is required, header/trailer monitor 53 sets de-multiplexer 52 to pass the next sequential packet, as selected by multiplexer 51, through encrypt/decrypt logic 58 and thence to packet routing logic 55. Header/trailer monitor 53 may also pass a decryption indication and the crypto bits from the header to encrypt/decrypt logic 58, causing said logic to decrypt the internal packet using the selected key material.

If header/trailer monitor 53 determines that the crypto bits in the header (Table I) are set to a non-zero value, indicating that encryption or decryption may be required, and from the origin and destination bits in the header that the internal packet both originated in a distant terminal and is also destined for a distant terminal, indicating that decryption is not required, header/trailer monitor 53 sets de-multiplexer 52 to pass the next sequential packet, as selected by multiplexer 51, directly to packet routing logic 55, bypassing encrypt/decrypt logic 58. This condition would apply if the packet were only to be routed through this local terminal (tandem connection). This capability may be used in a repeater application. It also may be used for loop around testing.

Header/trailer monitor 53 enables individual control of each user port's encryption. Since header/trailer monitor 53 exists in all terminals, control of encryption is one way, in the transmit direction. Therefore, the user can enable or disable encryption for each channel in each direction, and select one of three sets of key material (Table I) for each such channel and direction.

TDM transmission (TX) ports 57 are configured to transmit internal packets received from a particular WAN port as described above and destined for delivery to local ports. One TDM TX port 57 may be configured to transmit outgoing internal packets to the outgoing WAN port associated with the same particular WAN facility to and from said distant terminal.

User packets are delivered via TDM bus 109 to outgoing user or WAN ports 103, 104, 112, 113, 116 or 122 through associated internal packet logic 129, 108, 111, 114, 117 or 126 in any logic module 2, 3 or 4 in the local terminal. TDM bus 8 carries internal packets between logic module 2, 3 or 4 in the local terminal as required.

Packet routing logic 55 is configured to set de-multiplexer 56 to deliver internal packets received by Packet routing logic 55 to the appropriate TDM TX port 57 in response to the destination terminal and module port information contained in the header (Table I). This includes internal packets received from the associated WAN port and destined for local user ports as well as the internal packets received from local user ports and destined for the associated WAN port.

If more than one WAN port exists in a terminal, the logic described in this section may be duplicated for each such WAN port. Internal packets may readily be transmitted by more than one WAN port without conflict by configuring each such other WAN port's TDM RX ports 50 to receive the time slots assigned to the desired packet stream(s). If only one such WAN port has incoming internal packets containing the user data and destined for the same port(s), there is no conflict. However, if the user application cannot accept duplicate packets that might be received for the same local port, it may be necessary to select, by configuration commands, which set of incoming packets are to be used, with the other packet stream being dropped. Such selection may be done by configuration commands that enable only one set of packets at a time, perhaps in response to modem signal strength, error rate or other status information.

Data Path where Software is Unavoidable

MCU 119 allows use of software if absolutely necessary. While such software is not completely deterministic, it is more easily certified for safety if it is the only software function running in a dedicated processor, usually without the complexity and uncertainty of a Real Time Operating System (RTOS).

In an exemplary embodiment, data appearing as Ethernet at User Port Connections 5 that may require software processing, such as the Transmission Control Protocol/Internet Protocol (TCP/IP), may be connected to PHY (including associated transformers) 122 and MAC 121 in MCU 119 in logic module 4 and thence to a software TCP/IP protocol stack running in MCU 119. User data to or from said TCP/IP stack may then be sent to and from TDM bus 109 as internal packets via internal packet logic 126. Similarly, user serial data at user port connections 5 may be connected through a serial interface 6 to UART 120 in MCU 119 in logic module 2, and hence to special software running in MCU 119, which may communicate with TDM bus 109 through packet logic 126.

In an exemplary embodiment, as described above, TCP functionality may be implemented in software instead of implementing it in deterministic hardware circuits. However, in this exemplary embodiment, IP may be performed in deterministic hardware circuits, as has been described above for UDP/IP operation.

It is therefore possible to implement TCP/IP partially in hardware by connecting the Ethernet circuit carrying TCP/IP to PHY 103 or 104, MAC 132 or 105 and IP protocol stack 131 or 106 in any available logic module 2, 3 or 4. IP protocol stack 131 or 106 may be configured to bypass UDP protocol stack 130 or 107 and communicate directly through GPL 110 and parallel bus 115 to MCU 119, in which only the TCP protocol stack may run in software. User data to or from said TCP protocol stack may then be sent to and from TDM bus 109 as internal packets via internal packet logic 126.

M2M Multiplexing and De-Multiplexing in General Purpose Logic

In a further exemplary embodiment, if machine to machine (M2M) data is multiplexed by the user's equipment into other data, for instance telemetry and control (T&C) data, this combined T&C/M2M data may be connected to a serial user data connection appearing at User Port Connections 5 and thence through a serial electrical interface 6 to UART 113 and thence to internal packet logic (PKT) 114 in logic module 2, which may be configured to pass data transparently, since internal packets are not required for data destined for internal use. Application specific logic programmed in general purpose logic (GPL) 110 of logic module 2 may then de-multiplex this combined T&C/M2M data into M2M data which may be connected through UART 116 on logic module 2 to UART 27 on admin processor 35.

Separated T&C (or other) data may then be connected through packet logic (implemented in GPL 110) in logic module 2 to TDM bus 109, from where it is delivered to one or more sets of next packet selection and distribution logic (described above) and associated with a WAN port as with other data for delivery to a distant terminal. Conversely, T&C (or other) data from the distant terminal reverses the process and may be multiplexed with M2M data from Admin Processor 35 into a combined T&C/M2M data stream for return to the local user's equipment.

The above multiplexing/de-multiplexing method may be used to separate any two or more data streams for any reason, including delivery of one stream via one modem and another stream via another modem.

Alternatively, separate machine to machine (M2M) data for control and monitoring of the terminal and its modems may be connected from the user's equipment directly to UART 27 on admin processor 35 through asynchronous serial interface 27, or to Ethernet PHY 25 (including transformers) and MAC 26 on admin processor 35. In case of such direct connection of separate M2M data, the multiplexing/de-multiplexing function described in the previous paragraph is not needed. The user may also implement combinations, with some M2M data multiplexed into T&C (or other) data and some separate M2M data connected directly.

Example of Data Translation

In an exemplary embodiment, user data may need to be translated or otherwise manipulated. In an exemplary embodiment, user navigation and vehicle motion data may be translated into another format for use by a modem to steer its antenna in real time. Although this data may not be transmitted to the other end of the link, it is nevertheless critical to proper operation of the communication link and therefore benefits from being translated by deterministic hardware circuits instead of by software running in a processor, such as in MCU 119.

In a terminal located on a moving vehicle, asynchronous (ASYNC) navigation data such as Inertial Navigation System/Global Positioning System (INS/GPS) information is received from user equipment through a serial interface 6 from a user port connection 5 and applied to UART 112 in logic module 3. This data is passed unchanged through packet logic 111 to special translation logic programmed into GPL 110 via TDM bus 109. The received INS/GPS data is translated to ARINC-429 data by this logic in GPL 110 and is output via GPIO 128 as parallel addresses that reference locations in flash memory integrated circuit (IC) 20. These locations are preprogrammed with ARINC-429 messages. Depending on the results of the translation, the appropriate message is selected. These messages are then applied to ARINC-429 hardware output interface subsystem 21. The output of this subsystem is applied to an ARINC-429 input interface in modem 19. Modem 19 then controls its associated antenna 17 through its ARINC-429 output interface to keep the antenna pointed at the appropriate satellite or other target as the vehicle (and possibly the target) moves.

In another exemplary embodiment, as an alternative to using deterministic hardware circuit logic to translate navigation data as described above, said data may be connected to UART 120 in MCU 119 in logic module 3. Results of the translation process, as described above, may then be passed through a parallel connection from MCU 119 to GPL 110 and thence to GPIO 128 as either addresses for flash memory IC 20 or as messages for use by ARINC-429 output subsystem 21.

As with other such alternate software implementations described here, while not as demonstrably reliable as deterministic hardware circuits, such software, if implemented as the only application running in the processor of the MCU 119, would likely still be more reliable than multiple software functions running in a single processor under an RTOS.

Admin Processor Detail

In an exemplary embodiment, admin processor 35 may be used to do non-real-time initial configuration setup and ongoing status monitoring of logic modules 2, 3 and 4 and satellite modems 16 and 19. Admin processor 35 may communicate with logic modules 2, 3 and 4 via its UART 30 and multi-drop serial bus 7 to UART 124 in each logic module 2, 3 and 4. Each logic module 2, 3 and 4 has a unique address and is thus able to recognize and respond to its own identity. Responses from logic modules 2, 3 and 4 returning to admin processor 35 travel the reverse of the path described above. Admin processor 35 may communicate with satellite modem 16 or 19 via its UART 28, thence through UART 116, packet logic 117, TDM bus 109, packet logic 108, UDP protocol stack 107, IP protocol stack 106, MAC 105 and PHY 104 in logic module 4. Responses from modem 16 or 19 back to admin processor 35 may travel the reverse of the path described.

In another exemplary embodiment, UART 28 in admin processor 35 may be used to directly control and monitor modems 16 or 19 via direct connection though a serial interface 6 to a serial admin UART on modem 16 or 19, if either of these modems requires serial administration rather than Ethernet. Modems 16 or 19 may be configured to retain appropriate default settings in non-volatile storage, so that in the event of admin processor failure, the modems will continue communicating correctly, even if the power is turned off and back on or some other event causes a modem restart. Since logic modules 2, 3 and 4 contain similar non-volatile storage (EEPROM 123), the terminal continues to communicate correctly without a functioning admin processor, even after restart.

Admin processor 35 is provided with the hardware ability to monitor TDM bus 9. Due to concerns about the reliability of software, admin processor 35 may not be equipped with hardware to transmit on or otherwise interfere with TDM bus 8. Admin processor 35 monitors TDM bus 9 via GPIO parallel interface 32 and TDM RX logic 34 in FPGA 33. This interface allows admin processor 35 to monitor reports of terminal temperatures, fan and heater status, and VoIP subsystem 10 status, from monitor and control logic implemented in GPL 110 in logic module 2. Similarly, radome status reports may be obtained from radome 14 via a serial interface 6, UART 112, packet logic 111 (configured for no packets) and TDM bus 109 in logic module 3.

The read only connection that Admin processor 35 has to TDM bus 8 may also be used to monitor traffic on TDM bus 109 and to verify and trouble shoot logic module 2, 3 and 4 configuration settings during initial system setup.

In another exemplary embodiment, admin processor 35 may be used to directly perform ongoing status monitoring of power supply voltages, heaters or fans as required. Admin processor 35 may communicate with these devices using I$^2$C or other industry standard interfaces (not shown).

In a further exemplary embodiment, some or all of the housekeeping functions described above may be controlled and monitored without using admin processor 35 by connecting directly to a logic module 2, 3 or 4 through any available serial or Ethernet port, or multiplexing such monitor and control information into a user data stream such as T&C data, as described above for M2M Multiplexing and De-multiplexing in General Purpose Logic.

Optional Additional Modems and Logic Modules

In an exemplary embodiment, modems and associated antennas 23 or other WAN equipment may be added as required. In this exemplary embodiment, additional logic modules 24 may also be required. Should an additional modem be equipped, UART 29 in admin processor 35 may be utilized for admin functionality, connected either to an additional module 24 for conversion to Ethernet or connected directly to a serial admin port on said additional modem, as described above for administration of the primary modem.

Optional Ethernet or USB Multiplex Hardware Instead of TDM

In accordance with a further aspect of an exemplary embodiment, an alternative to time division multiplexing data prior to sending and receiving the data in Ethernet packets to and from the modems may be to substitute Ethernet switches for part or all of the multiplexing function of TDM busses 8 and 109 as a means of delivering packets from multiple sources to a single modem or other WAN port. While not considered by some safety authorities to be sufficiently deterministic and reliable, Ethernet switches may deliver packets to the intended destination, based on the destination IP address of each packet, which would correspond to the IP address of each modem or other WAN port in the transmit direction and each logic module 2, 3 or 4 in the receive direction. This exemplary embodiment may require more Ethernet ports on each module or more modules to accommodate conversion of data from numerous non-Ethernet user data ports to Ethernet packets for purposes of connection to numerous Ethernet switch ports for switching and delivery to the appropriate modem or other WAN port.

USB hubs may also be used in lieu of TDM, as described above for Ethernet switches. Such use may likely encounter the same disadvantages as Ethernet switching.

In a multiple WAN application, it may be necessary, if using Ethernet or USB switching instead of TDM for part or all of the multiplexing function, to create duplicates of packets that are to be sent to more than one modem. Otherwise, IP multicast or broadcast addressing must be used; however, some modems or satellite networks may not accommodate such multicast or broadcast packet addresses. This duplication function may be performed by general purpose logic 110 in any logic module 2, 3 or 4.

In an exemplary embodiment, Ethernet switches may be required to be sufficiently fast and to contain sufficient buffer memory to prevent packet loss in the event of congestion due to multiple simultaneous arrival of packets destined for the same IP address. Typical commercially available 100 Mbps Ethernet switches may meet these requirements. Similarly, USB 3.0 might be sufficiently fast.

The aforementioned possibility of packet loss or delay in Ethernet switches or USB hubs is ameliorated in the preferred embodiments by the use of TDM busses with excessive bandwidth, FIFO buffers at each user data source and at each intermediate TDM data access point, coupled with next packet logic assuring that the next available packet is always selected for insertion into the outgoing data stream to a distant terminal.

As noted herein, although the exemplary embodiments have been disclosed with primary application for communication terminals for use with unmanned vehicle systems, the principles are equally applicable for any type of control terminals.

Having described preferred embodiments of new and improved Modular Deterministic Communication Terminals, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A modular deterministic communication terminal comprising:
   at least two logic modules each comprising at least one deterministic hardware circuit configured to generate at least one data stream by combining user data of at least two data channels and to separately and independently transmit the at least one data stream via at least one communication link to at least one deterministic hardware circuit provided in a remote modular deterministic communication terminal;
   multiplexing hardware configured to directly connect the at least two logic modules wherein the multiplexing hardware comprises a Time Division Multiplex (TDM) bus, and
   an admin processor connected to the multiplexing hardware and configured to set operating parameters of the at least one deterministic hardware circuit,
   wherein the at least one deterministic hardware circuit comprises:
      an internal TDM bus connected to and synchronized with the TDM bus;
      an internal packet logic connected to the internal TDM bus and configured to receive and pass user data carried by data channels to the internal TDM bus, to construct packets by multiplexing data packets that contain the user data in an order in which they are received, and to deliver the packets to at least one preconfigured destination port via the internal TDM bus; and
      a dual port RAM implemented as a First In First Out (FIFO) buffer associated with each packet logic instance to insert header bytes ahead of incoming data and to append trailer bytes after the last byte of a packet is entered into the dual port RAM.

2. The modular deterministic communication terminal of claim 1, wherein the at least one deterministic hardware circuit is configured to generate and transmit the at least one data stream without performing operations in software executed on a processor.

3. The modular deterministic communication terminal of claim 1, further comprising:
   at least one modem and at least one antenna associated with the at least one communication link and configured to transmit the at least one data stream via at least one connection.

4. The modular deterministic communication terminal of claim 1, wherein the at least one logic module further comprises at least one Micro Controller Unit (MCU) connected to the at least one deterministic hardware circuit,
   wherein the at least one deterministic hardware circuit is configured to operate without performing any operation in software, and
   wherein the at least one MCU is configured to perform operations in software.

5. The modular deterministic communication terminal of claim 1, wherein the at least one deterministic hardware circuit comprises a Field Programmable Gate Array (FPGA).

6. The modular deterministic communication terminal of claim 1, wherein a first deterministic hardware circuit of the at least one deterministic hardware circuit is configured to generate a first data stream of the at least one data stream to separately and independently transmit the first data stream via a first communication link of the at least one communication link, and
   wherein a second deterministic hardware circuit of the at least one deterministic hardware circuit is configured to generate an alternative data stream of the at least one data stream to transmit the alternative data stream separately and independently from the first data stream via an alternative communication link of the at least one communication link.

7. A method for transmitting user data between a modular deterministic communication terminal and a remote modular deterministic communication terminal, comprising:
   directly connecting at least two logic modules via multiplexing hardware, wherein the multiplexing hardware comprises a Time Division Multiplex (TDM) bus;
   generating, by at least one of the at least two logic modules comprising at least one deterministic hardware circuit, at least one data stream by combining user data of at least two data channels;
   separately and independently transmitting the at least one data stream via at least one communication link to at least one deterministic hardware circuit provided in a remote modular deterministic communication terminal;
   connecting an admin processor to the multiplexing hardware; and
   setting operating parameters of the at least one deterministic hardware circuit by the admin processor,
   wherein the at least one deterministic hardware circuit comprises:
   an internal TDM bus connected to and synchronized with the TDM bus;
   an internal packet logic connected to the internal TDM bus and configured to receive and pass user data carried by data channels to the internal TDM bus, to construct packets by multiplexing data packets that contain the user data in an order in which they are received, and to deliver the packets to at least one preconfigured destination port via the internal TDM bus; and
   a dual port RAM implemented as a First In First Out (FIFO) buffer associated with each packet logic instance to insert header bytes ahead of incoming data and to append trailer bytes after the last byte of a packet is entered into the dual port RAM.

8. The method for transmitting user data between a modular deterministic communication terminal and a remote modular deterministic communication terminal of claim 7, further comprising:
   configuring the at least one deterministic hardware circuit to generate and transmit the at least one data stream without performing operations in software executed on a processor.

9. The method for transmitting user data between a modular deterministic communication terminal and a remote modular deterministic communication terminal of claim 7, further comprising:
   configuring at least one modem and at least one antenna associated with the at least one communication link to provide at least one connection, and
   transmitting the at least one data stream via the at least one connection.

10. The method for transmitting user data between a modular deterministic communication terminal and a remote modular deterministic communication terminal of claim 7, wherein the at least one logic module further comprises at least one Micro Controller Unit (MCU) connected to the at least one deterministic hardware circuit, wherein the at least one deterministic hardware circuit is configured to operate without performing any operation in software, and
wherein the at least one MCU is configured to perform operations in software.

11. The method for transmitting user data between a modular deterministic communication terminal and a remote modular deterministic communication terminal of claim 7, wherein the at least one deterministic hardware circuit comprises a Field Programmable Gate Array (FPGA).

12. The method for transmitting user data between a modular deterministic communication terminal and a remote modular deterministic communication terminal of claim 7, further comprising:
   generating, by a first deterministic hardware circuit of the at least one deterministic hardware circuit, a first data stream of the at least one data stream;
   separately and independently transmitting the first data stream via a first communication link of the at least one communication link;
   generating, by a second deterministic hardware circuit of the at least one deterministic hardware circuit, an alternative data stream of the at least one data stream; and
   transmitting the alternative data stream separately and independently from the first data stream via an alternative communication link of the at least one communication link.

13. A system for transmitting user data between a modular deterministic communication terminal and a remote modular deterministic communication terminal, comprising:
   a modular deterministic communication control terminal comprising:
      at least two first logic modules each comprising at least one first deterministic hardware circuit;
      first multiplexing hardware configured to directly connect the at least two first logic modules; and
      a first admin processor connected to the first multiplexing hardware and configured to set operating parameters of the at least one first deterministic hardware circuit; and
   a remote modular deterministic communication terminal comprising:
      at least two second logic modules each comprising at least one second deterministic hardware circuit;
      second multiplexing hardware configured to directly connect the at least two second logic modules; and
      a second admin processor connected to the second multiplexing hardware and configured to set operating parameters of the at least one second deterministic hardware circuit,
   wherein the at least one first deterministic hardware circuit is configured to generate at least one data stream by combining user data of at least two data channels and to separately and independently transmit the at least one data stream via at least one communication link to the at least one second deterministic hardware circuit of the remote modular deterministic communication terminal;
   wherein the first multiplexing hardware comprises a first Time Division Multiplex (TDM) bus and the second multiplexing hardware comprises a second TDM bus,
   wherein the at least one first deterministic hardware circuit comprises:
      a first internal TDM bus connected to and synchronized with the first TDM bus;
      a first internal packet logic connected to the first internal TDM bus and configured to receive and pass user data carried by data channels to the first internal TDM bus, to construct packets by multiplexing data packets that contain the user data in an order in which they are received, and to deliver the packets to at least one first preconfigured destination port via the first internal TDM bus; and
      a first dual port RAM implemented as a first First In First Out (FIFO) buffer associated with each first packet logic instance to insert first header bytes ahead of first incoming data and to append first trailer bytes after the last byte of a first packet is entered into the first dual port RAM, and
   wherein the at least one second deterministic hardware circuit comprises:
      a second internal TDM bus connected to and synchronized with the second TDM bus;
      a second internal packet logic connected to the second internal TDM bus and configured to receive and pass user data carried by data channels to the second internal TDM bus, to construct packets by multiplexing data packets that contain the user data in an order in which they are received, and to deliver the packets to at least one second preconfigured destination port via the second internal TDM bus; and
      a second dual port RAM implemented as a second FIFO buffer associated with each second packet logic instance to insert second header bytes ahead of second incoming data and to append second trailer bytes after the last byte of a second packet is entered into the second dual port RAM.

* * * * *